United States Patent [19]

Brandimarte

[11] Patent Number: 4,648,185
[45] Date of Patent: Mar. 10, 1987

[54] LEVELING TOOL

[76] Inventor: Umberto L. Brandimarte, 5200 D3 Royalton Rd., North Royalton, Ohio 44133

[21] Appl. No.: 813,559

[22] Filed: Dec. 26, 1985

[51] Int. Cl.⁴ .......................... G01B 5/14; G01C 9/26
[52] U.S. Cl. ........................................ 33/189; 33/485
[58] Field of Search ..................... 33/180 R, 189, 334, 33/451, 485

[56] References Cited

U.S. PATENT DOCUMENTS

| | | | |
|---|---|---|---|
| 2,592,877 | 4/1952 | Ellington | 33/189 |
| 3,068,580 | 12/1962 | Orthwin | 33/485 |
| 3,173,214 | 3/1965 | Daller | 33/485 |
| 3,402,474 | 9/1968 | Janeiro | 33/189 |
| 4,241,510 | 12/1980 | Radecki | 33/189 |

FOREIGN PATENT DOCUMENTS 2750716  5/1979  Fed. Rep. of Germany ........ 33/189
575360   2/1946  United Kingdom ................. 33/189

Primary Examiner—Richard R. Stearns
Attorney, Agent, or Firm—Harvey B. Jacobson

[57] ABSTRACT

A leveling tool for accurately marking a pair of points on a horizontal or vertical line, for example for use in hanging pictures or shelves, has an elongate bar provided with a fixed tab member, a longitudinally movable second tab member and bubble gauges set parallel with and at right angles to the length of the bar. The fixed tab member is used as a pivot placed on one of the points, and the tool is swung around the pivot until one or other of the bubble gauges is level. The second tab member is then used to mark the second point.

7 Claims, 4 Drawing Figures

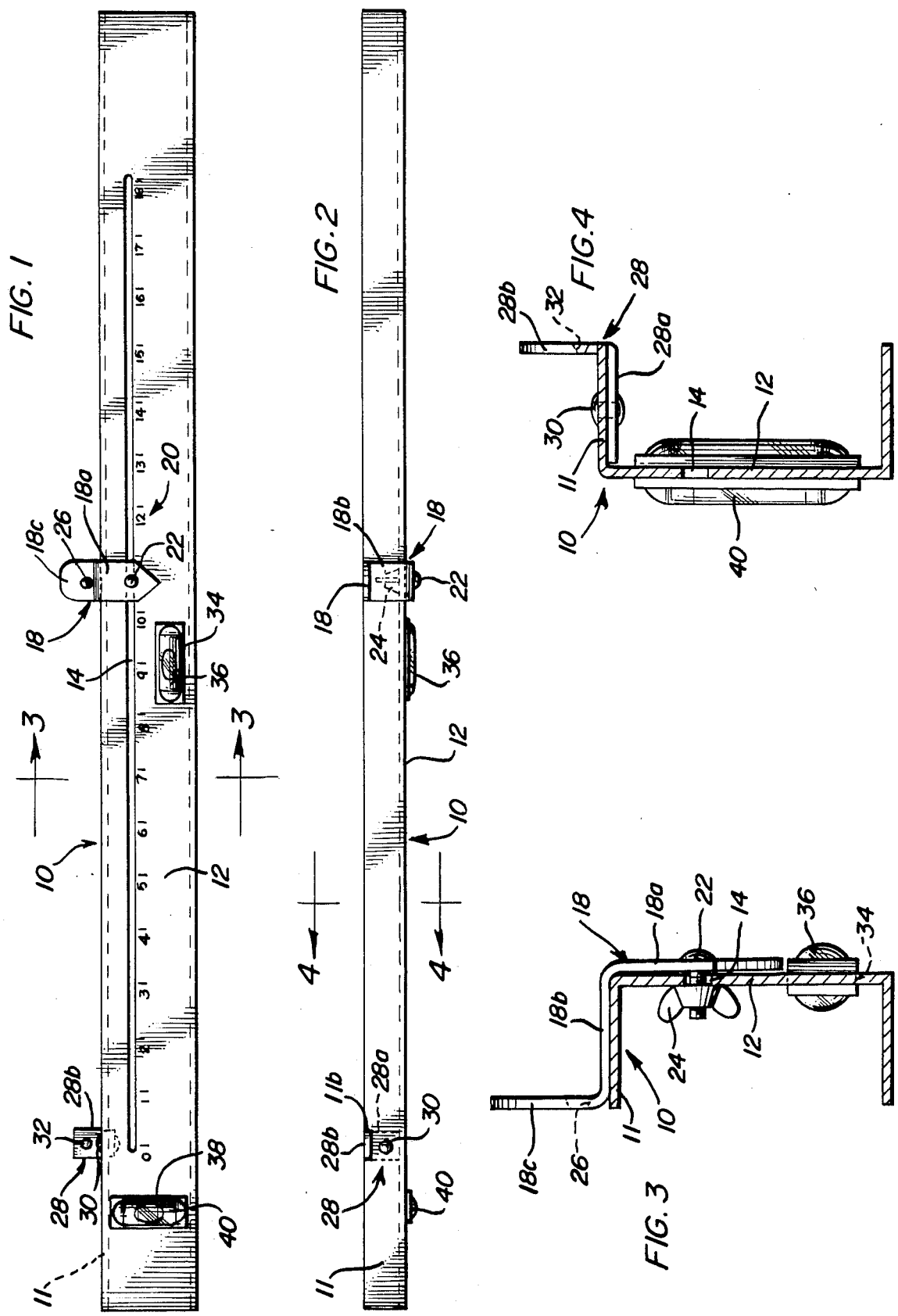

4,648,185

LEVELING TOOL

BACKGROUND OF THE INVENTION

Field of the Invention

This invention relates to a tool for use in setting out points on a horizontal or vertical line. For example, in numerous instances, such as hanging pictures or shelves, or in various carpentry and other fields of work, it is necessary to set out points on an accurately determined horizontal or vertical line on a work surface such as a building wall. The invention provides a simple tool for this purpose which can be easily manipulated in use by one person without having to exercise any great skills or aptitudes.

SUMMARY OF THE INVENTION

The invention provides a tool for the purpose indicated comprising an elongate rod-like element having a longitudinally extending guidetrack marked as a measuring scale, a first projecting fixed tab substantially located at one end of the track, the tab having a first opening for receipt of a pointed or like instrument for positioning at one end of a line to be set out, a second projecting tab movable along the track, the second tab having a further opening for receipt of another pointed instrument spaced from the track a distance corresponding to the spacing of the first opening from the track, releaseable locking means for fixing the second tab a selected distance along the track from the first tab, and at least one bubble gauge aligned in parallel with or perpendicular to the track. Preferably, the tool includes a first bubble gauge aligned in parallel with the track and a second bubble gauge aligned perpendicular to the track.

In use, for example for setting out points on a wall on an accurately horizontal line, the second tab is set at a distance from the first tab corresponding to the distance between the points, a pointed instrument is placed through the hole in the first tab against the first point, a further pointed instrument (such as a pen or pencil) is placed through the hole in the second tab, and the tool is swung about the first pointed instrument as a pivot until the bubble gauge that is parallel to the track indicates that the tool is level. The second pointed instrument is then at the correct location of the second point, which can thus be marked on the wall. For marking points on a vertical line, a similar procedure is adopted but the other bubble gauge is used as the level.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is an elevational view of a leveling tool in accordance with the invention.

FIG. 2 is a plan view thereof.

FIG. 3 is an enlarged sectional view on line 3—3 of FIG. 1.

FIG. 4 is an enlarged sectional view on line 4—4 of FIG. 2.

DESCRIPTION OF PREFERRED EMBODIMENT

The illustrated tool includes an elongate rod or bar-like element 10 which, in the form shown, is a channel-shaped aluminum extrusion about two feet in length, about one and three-quarter inch in width, and with a depth of about three-quarter inch. Substantially centrally disposed along the length of web 12 of the element 10 is a longitudinal slot 14 forming a guidetrack, as will be described, for a movable tab member 18. The slot may be marked with a measuring scale 20.

Tab 18 is bent at a double right angle so as to provide a front limb 18a on the front surface of element 10, an intermediate limb 18b on top of the element, an upwardly projecting back limb 18c which is flush with the rear edges of the element 10. Front limb 18a has a pointed bottom providing a pointer indicating the position of tab 18 along scale 20, and a threaded pin 22 extends through limb 18a and through slot 14. A wing nut 24 is threaded onto pin 22 behind web 12, whereby tab 18 can be releaseably fixed in position at any selected location along the slot, by tightening the wing nut. Limb 18c of tab 18 is provided with an opening 26 for a pointed instrument (not shown) such as a pen or pencil.

At the left end of slot 14, at the zero position of scale 20, element 10 is provided with another fixed tab member 28 which is of angled form having a lower limb 28a secured to flange 11 of element 10 for example by a rivet 30, and a upwardly extending limb 28b in a recess 11b of the flange so that limb 28b is coplanar with limb 18c of tab 18. Limb 28b also has an opening 32 for a pointed instrument, opening 32 being the same distance above slot 14 as opening 26.

Web 12 of element 10 has a pocket 34 in which a first bubble gauge vial 36 is fixed, vial 36 being parallel to slot 14. Another pocket 38 is provided adjacent one end of web 12 for a second bubble gauge vial 40 which is perpendicular to slot 14.

When it is desired to lay out points on a horizontal line, for example on a wall, tab 18 is fixed in slot 14 at a distance from its zero end corresponding to the required distance between the points, and the tool is held against the wall with a first pointed instrument inserted through opening 32 against a first one of the points (the position of which is preestablished). To locate the second point, a second pointed instrument is inserted through opening 26, and the tool is swiveled about the first pointed instrument as a pivot until bubble gauge 36 indicates that the tool is level. The second pointed instrument is now at the proper location of the second point and can be used to mark it on the wall. It will be readily understood that for setting points on a vertical line, a similar procedure may be adopted using bubble gauge 40 as a level indicator instead of gauge 36.

In a modification of the invention, element 10 can be a solid bar rather than a channel shaped extrusion and a tab corresponding to tab 18 could be mounted for movement along a recessed screw-head receiving slot in the bar. It will be evident that marking tools in accordance with the invention are simple and economical to manufacture and easy to use.

The foregoing is considered as illustrative only of the principles of the inveniton. Further, since numerous modifications and change will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for marking a pair of points on at least one of a horizontal and vertical line comprising an elongate element having a longitudinally extending guidetrack, a first fixed tab projecting from the elongate member adjacent one end of the guidetrack, the first tab having pivot forming means for the tool associated therewith laterally spaced from the guidetrack for positioning on one of said points, a second projecting tab movable along the guidetrack, releasable locking means for fixing the second tab in selected positions along the guidetrack spaced longitudinally from the first tab a distance corresponding to the distance between said points, means associated with the second tab for a marker located at a lateral distance from the guidetrack corresponding to the lateral spacing of the pivot forming means from the guidetrack, and at least one bubble gauge associated with the elongate element, the elongate member having a front face and a rear edge, the first and second tabs being coplanar with the rear edge and the bubble gauge being exposed for view on the front face.

2. The invention of claim 1 wherein the guidetrack is marked with a measuring scale on said front face and the pivot forming means is located substantially level with a zero mark of the scale.

3. The invention of claim 1 wherein the elongate member is provided with first and second bubble gauges, the first bubble gauge being located adjacent the guidetrack in parallel therewith and the second bubble gauge being located adjacent one end the guide track in perpendicular relation thereto.

4. The invention of claim 1 wherein the pivot forming means comprises an opening in the first tab for a first pointed instrument.

5. The invention of claim 4 wherein the means associated with the second tab is a further opening in the second tab for a pointed marking instrument.

6. A tool for marking a pair of points on at least one of a horizontal and vertical line comprising an elongate element having a longitudinally extending guidetrack, a first fixed tab projecting from the elongate member adjacent one end of the guidetrack, the first tab having pivot forming means for the tool associated therewith laterally spaced from the guidetrack for positioning on one of said points, a second projecting tab movable along the guidetrack, releasable locking means for fixing the second tab in selected positions along the guidetrack spaced longitudinally from the first tab a distance corresponding to the distance between said points, means associated with the second tab for a marker located at a lateral distance from the guidetrack corresponding to the lateral spacing of the pivot forming means from the guidetrack, and at least one bubble gauge associated with the elongate element, the elongate member having a front face and a rear edge, the first and second tabs being coplanar with the rear edge and the bubble gauge being exposed for view on the front face, wherein the elongate member comprises a channel-section bar, the guidetrack comprises an elongate slot in a web portion of the bar defining said front face, and the second tab is formed as an upwardly extending limb of a tab member having another limb carrying a screw tightening assembly extending through the slot and defining said locking means.

7. The invention of claim 6 wherein said another limb of the tab member has a pointer for indicating movement along a measuring scale associated with the slot.

* * * * *